(12) United States Patent
Sato et al.

(10) Patent No.: US 9,228,463 B2
(45) Date of Patent: Jan. 5, 2016

(54) EXHAUST GAS PURIFICATION CONTROL DEVICE FOR AN INTERNAL COMBUSTION ENGINE

(75) Inventors: Kenichi Sato, Yokohama (JP); Hideaki Takahashi, Yokohama (JP); Sho Amanai, Sagamihara (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 14/112,629

(22) PCT Filed: Feb. 24, 2012

(86) PCT No.: PCT/JP2012/054598
§ 371 (c)(1),
(2), (4) Date: Nov. 7, 2013

(87) PCT Pub. No.: WO2012/144269
PCT Pub. Date: Oct. 26, 2012

(65) Prior Publication Data
US 2014/0060016 A1 Mar. 6, 2014

(30) Foreign Application Priority Data
Apr. 22, 2011 (JP) ................. 2011-095680

(51) Int. Cl.
*F01N 3/00* (2006.01)
*F01N 3/10* (2006.01)
*F01N 3/20* (2006.01)
*F02D 41/02* (2006.01)
(Continued)

(52) U.S. Cl.
CPC .............. *F01N 3/20* (2013.01); *F01N 13/009* (2014.06); *F02D 41/0295* (2013.01);
(Continued)

(58) Field of Classification Search
CPC ......... F01N 3/101; F01N 3/20; F01N 13/009; F01N 3/103; F02D 2200/0814; F02D 41/0295; F02D 41/1441; F02D 41/126; Y02T 10/22
USPC .................................... 60/285, 299
See application file for complete search history.

(56) References Cited

U.S. PATENT DOCUMENTS

| | | | |
|---|---|---|---|
| 6,338,243 B1 | 1/2002 | Takaoka et al. | |
| 6,751,950 B2 * | 6/2004 | Ikemoto et al. | ................. 60/285 |
| 2004/0006971 A1 | 1/2004 | Kamoto et al. | |

FOREIGN PATENT DOCUMENTS

| | | |
|---|---|---|
| EP | 0903479 A2 | 3/1999 |
| JP | H10-339195 A | 12/1998 |

(Continued)

*Primary Examiner* — Jesse Bogue
*Assistant Examiner* — Diem Tran
(74) *Attorney, Agent, or Firm* — Drinker Biddle & Reath LLP

(57) ABSTRACT

An exhaust gas purification control device for an internal combustion engine is provided with: a detection unit for detecting an air-fuel ratio or rich/lean state of exhaust gas that flows out of a first catalyst disposed at upstream side; estimating unit for estimating the oxygen adsorption amount on the first catalyst and a second catalyst; and an enrichment control unit for enriching or set the degree of richness temporarily by varying the degree of richness of injected fuel when the amount of the oxygen adsorption on the first catalyst and the second catalyst is estimated to be equal to or greater than a predetermined value. The enrichment control unit sets the degree of richness of the injected fuel to a first degree of richness that is greater than stoichiometry from the start of the enrichment process, and maintains the first degree of richness even after the output of the detection unit has reached a stoichiometric air-fuel ratio or rich/lean value.

3 Claims, 4 Drawing Sheets

(51) Int. Cl.
 *F02D 41/14* (2006.01)
 *F02D 41/12* (2006.01)
 *F01N 13/00* (2010.01)

(52) U.S. Cl.
 CPC .......... *F02D 41/123* (2013.01); *F02D 41/126* (2013.01); *F02D 41/1441* (2013.01); *F01N 3/101* (2013.01); *F01N 3/103* (2013.01); *F02D 2200/0814* (2013.01); *Y02T 10/22* (2013.01)

(56) References Cited

FOREIGN PATENT DOCUMENTS

| | | |
|---|---|---|
| JP | 2002-276433 A | 9/2002 |
| JP | 2005-299430 A | 10/2005 |
| WO | WO-2006/128782 A1 | 12/2006 |

\* cited by examiner

EXHAUST GAS PURIFICATION CONTROL DEVICE FOR AN INTERNAL COMBUSTION ENGINE

TECHNICAL FIELD

The present invention relates to an exhaust gas purification control device for an internal combustion engine.

BACKGROUND ART

An exhaust gas purification control device is known in which a plurality of catalysts are arranged in series in an exhaust passage and an air-fuel (A/F) ratio is controlled while detecting the status of an upstream side catalyst and a downstream side catalyst, wherein, when the oxygen adsorption amount of respective catalysts becomes excessive during a fuel-cut operation for example, the rich degree or the degree in richness of the air-fuel ratio will be changed based on the detection values across the downstream catalyst (Patent Document 1).

PRIOR ART DOCUMENTS

Patent Document 1:

SUMMARY OF THE INVENTION

Problem to be Solved by the Invention

However, in the control method of the prior art, because the control process decreases an air-fuel ratio in accordance with the detected value of the air-fuel ratio sensors before and after the downstream catalyst from the richest state in the second half of the rich degree change control, there is a problem that recovery in the oxygen storage capacity is inefficient.

The challenge that the present invention tries to solve is to provide an exhaust gas purification control device which can recover efficiently the oxygen storage capacity of the downstream catalyst.

Mechanism for Solving the Problem

The present invention solves the problem described above by setting the rich degree or degree in richness of injected fuel to a first degree in richness that is greater than stoichiometric from a start of enrichment process and maintaining the first degree in richness even after the air-fuel ratio of exhaust gas exiting the upstream catalyst has reached the stoichiometric.

Effect of the Invention

According to the present invention, by maintaining the first degree of richness even after the air-fuel ratio of the exhaust gas flowing out of the upstream catalyst reaches the stoichiometric, the oxygen adsorbed on the downstream catalyst can be reduced rapidly and the oxygen storage capacity of the downstream catalyst can be recovered efficiently.

EMBODIMENT FOR CARRYING OUT THE INVENTION

Figure 1:
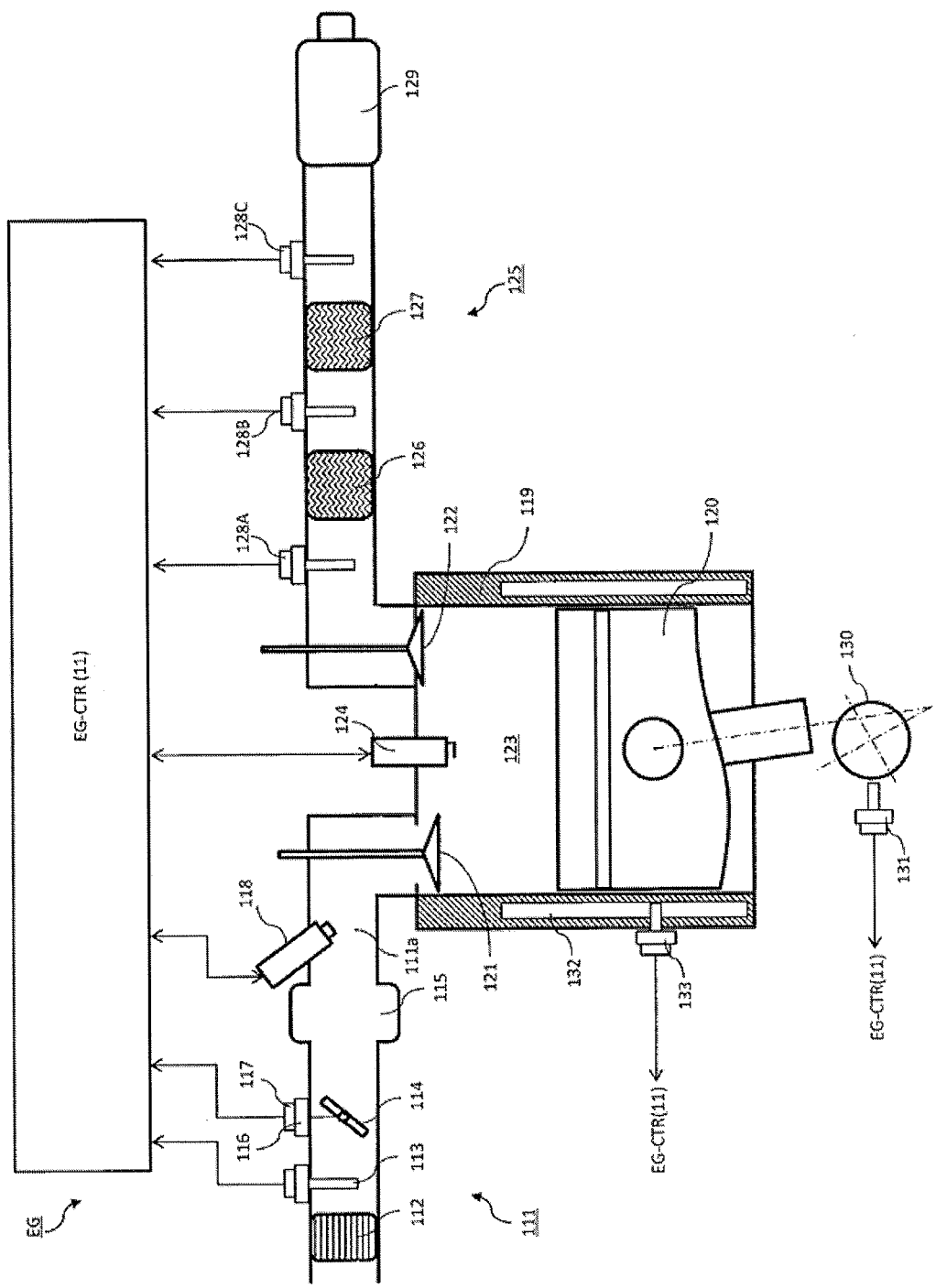
FIG. 1 is a block diagram illustrating an internal combustion engine to which is applied an embodiment of the present invention.

FIG. 1 is a block diagram illustrating an engine EG, to which is applied an embodiment of the present invention. An intake passage 111 of the engine EG is provided with an air filter 112, an intake air flow meter 113 for detecting an intake air flow rate, a throttle valve 114 for controlling the intake air rate, and a collector 115.

The throttle valve 114 is provided with an actuator 116 such as a DC motor that adjusts the opening degree of the throttle valve 114. In order to achieve the required torque that is calculated based on the accelerator pedal operation amount of the driver, in response to a drive signal from the engine control unit 11, the throttle valve actuator 116 electronically controls the opening of the throttle valve 114. Further, a throttle sensor 117 for detecting the opening of the throttle valve 114 is provided and is configured to output the detection signal to the engine control unit 1. In addition, the throttle sensor 117 can also serve as an idle switch.

Further, a fuel injection valve 118 is provided to face the intake passage 111a which branches from the collector 115 into each cylinder. The fuel injection valve 118 is driven to open by a driving pulse signal set by the engine control unit 1 and is configured to inject fuel into an intake passage (hereinafter, also referred to as a fuel injection port) 111a, which is fed under pressure from a fuel pump (not shown) and regulated at a predetermined pressure by way of a pressure regulator. Note that, in place of disposing the fuel injection valve 118 in the fuel injection port 111a, a so-called direct fuel injection type may also be applied where the fuel injector is disposed on the combustion chamber 123 for injecting fuel directly.

A space surrounded by a cylinder 119, a crown surface of the piston 120 reciprocally movable within the cylinder, and a cylinder head comprising an intake valve 121 and an exhaust valve 122 constitutes a combustion chamber 123. A spark plug 123 is mounted to face the combustion chamber of each cylinder 123 and is configured to ignite an intake air-fuel mixture based on the ignition signal from the engine control unit 11.

Meanwhile, the exhaust passage 125 is provided with exhaust purification catalysts 126, 127 in series for purifying exhaust gas. The exhaust gas purifying catalysts 126 and 127 according to the present embodiment employ a catalyst supporting an oxidation catalyst or three-way catalyst on porous crystalline aluminosilicates (the so-called zeolite)which adsorb unburned gases such as hydrocarbons HC. The adsorbent comprised of from a zeolite and the like adsorb physically unburned gas in the low temperature range while the adsorbent has the property of desorbing unburned gas adsorbed in the high temperature range, at somewhere around e.g 150° C. due to Molecular motion.

Further, the three-way catalyst which is supported on the adsorbent such as zeolite, when it reaches the activation temperature, may oxidize carbon monoxide CO as well as oxidation of hydrocarbons HC in the exhaust gas in the vicinity stoichiometric (stoichiometric air-fuel ratio, λ=1, air weight/ fuel weight=14.7) while performing the reduction of nitrogen oxides NOx to thereby purify the exhaust gas. Further, the oxidation catalyst oxidizes the hydrocarbons HC and carbon monoxide CO in the exhaust gas.

Incidentally, in the present embodiment, both the adsorbent for adsorbing unburned gas and the three-way catalyst or oxidation catalyst are constructed as a single exhaust purification catalyst, and two catalysts of this type 126, 127 are disposed in series. There may be three or more of them disposed. Below, the catalyst disposed upstream side of the exhaust passage 125 is referred to as a first catalyst while the downstream side catalyst is referred to as a second catalyst 127, respectively.

The exhaust passage 125 is provided with three air-fuel ratio sensors 128A, 128B, and 128C for detecting an air-fuel (A/F) ratio of exhaust and thus of an intake air mixture by detecting a specific component in the exhaust gas, for example, the oxygen concentration and the detection signals thereof are respectively output to the engine control unit 11. This air-fuel ratio sensor 128 may be in the form of an oxygen sensor for providing a rich/lean output, or may be configured as a wide-range air-fuel ratio sensor detecting the air-fuel ratio linearly over a wide range.

Out of the three air-fuel ratio sensors disposed in the exhaust passage 125, the first air-fuel ratio sensor 128A is disposed near the inlet of the first catalyst 126 to detect the air-fuel ratio or rich/lean of the exhaust gas flowing in the first catalyst 126 and outputs to the engine control unit 11. The second air-fuel ratio sensor 128B is disposed in the exhaust passage 125 between the first catalyst 126 and the second catalyst 127 to detect an air-fuel ratio or rich/lean status of the exhaust gas exiting the first catalyst 126 and flowing into the second catalyst 127 and ouputs to the engine control unit 11. The third air-fuel ratio sensor 128C is provided in the vicinity of an outlet of the second catalyst 127 to detect an air-fuel ratio or a rich/lean state of the exhaust gas leaving the second catalyst 127 and outputs to the engine control unit 11.

In addition, reference sign 129 in FIG. 1 is a muffler.

A crank angle sensor 131 is provided on the crankshaft 130 of the engine EG. The engine control unit 11 may detect an engine rotation speed Ne either by counting crank unit angle signals which are generated in synchronization with engine rotation over a constant time, or by measuring a period of a crank reference angle signal.

A water temperature sensor 133 is provided to face a cooling jacket 132 of the engine EG to detect a coolant temperature Tw in the water jacket 132 and outputs the detection signal to the engine control unit 11.

A normal air-fuel ratio feedback control is performed when the water temperature of the engine cooling water detected by the water temperature sensor 133 is at a predetermined temperature or higher, and the operating state of the engine EG is not in the high rotation and high load region. To describe an example, the air-fuel ratio of the exhaust gas exiting the second catalyst 127 is first detected by the third air-fuel ratio sensor 128C, and, based on the output of this third air-fuel ratio sensor 128C, a target air-fuel ratio of the exhaust gas exiting from the first catalyst 126 is set. Then, the air-fuel ratio of the exhaust gas exiting the first catalyst 126 is detected by the second air-fuel ratio sensor 128B, and, based on the deviation from the target air-fuel ratio described above, a target air-fuel ratio entering the first catalyst 126 is set. Finally, based on the deviation between this target air-fuel ratio and the output of the first air-fuel ratio sensor 128A, an air-fuel ratio correction coefficient is calculated. The air-fuel ratio of intake air that is introduced into the combustion chamber 123 is feedback controlled using this air-fuel ratio correction coefficient.

Now, while the engine EG is in operation, when, for example, the engine speed exceeds a predetermined value with the accelerator opening degree being zero, or, when the engine speed enters the red zone, the engine control unit 11 temporarily interrupts a fuel injection from the fuel injection valve 118 in order to increase fuel economy and to prevent excessive increase in the engine rotation speed. When performing the fuel-cut operation at vehicle deceleration or during a high engine rotation, the oxygen introduced into the combustion chamber 123 will be discharged into the exhaust passage 125 without combustion. Thus, the oxygen adsorption amount of first catalyst 126 and the second catalyst 127 increases significantly. Due to the excessive increase in the oxygen adsorption amount of the first and second catalysts 126, 127, the processing capacity of the NOx in the exhaust gas falls.

Therefore, in the present embodiment, upon resuming the fuel injection after fuel cut has been finished, by setting the air-fuel ratio of an air mixture introduced into the combustion chamber 123 is temporarily enriched to cause the oxygen adsorbed on the first catalyst 126 and the second catalyst 127 to react with the rich components (HC, CO etc.,) so that the oxygen adsorption amount of the first and second catalysts 126, 127 may be rapidly decreased. In this instance, further, in order to reduce the oxygen adsorption amount of the downstream side catalyst (the second catalyst 127 in the present embodiment) in particular, the control described below will be implemented.

Figure 2:
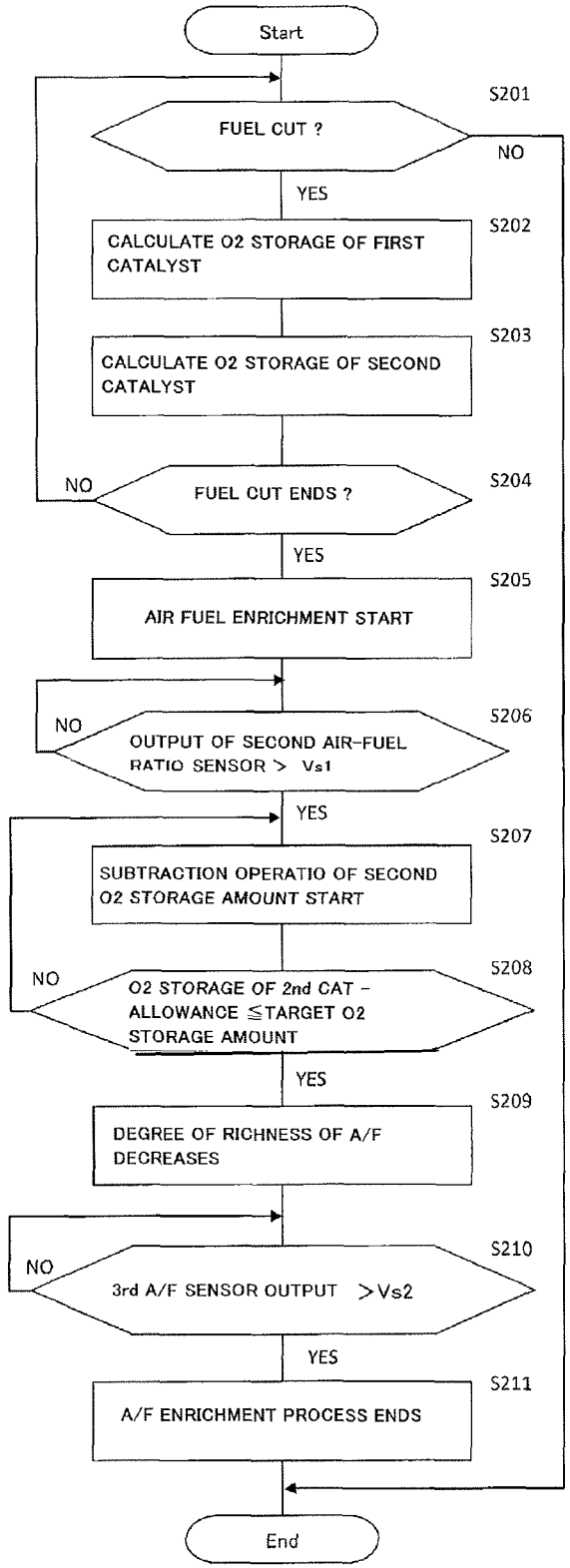
FIG. 2 is a flowchart illustrating a procedure of the exhaust gas purification control executed by an engine control unit in FIG. 1.
Figure 4:
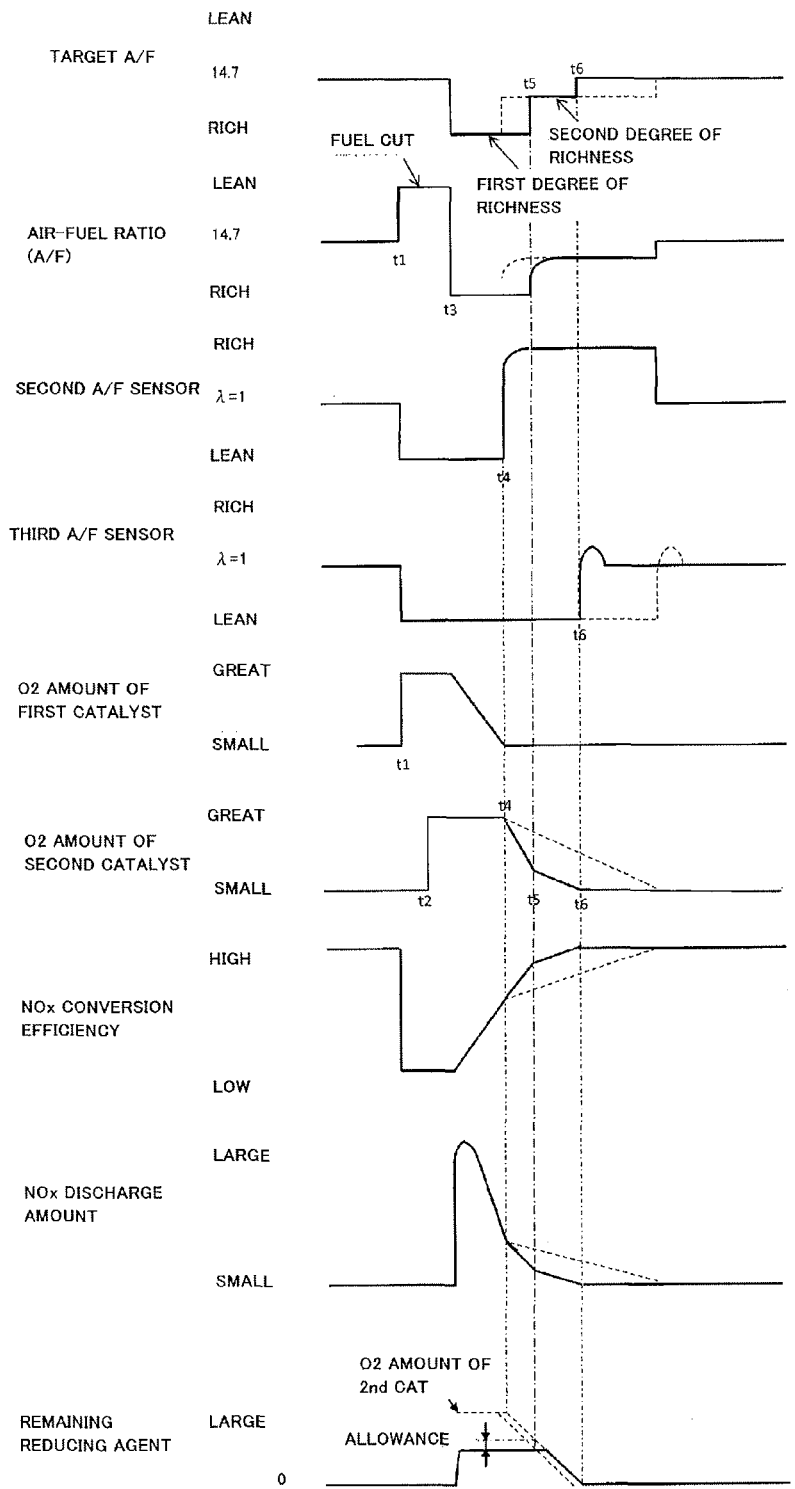
FIG. 4 is a time chart showing the temporal state of each element when executing the controls in FIGS. 3 and 4.

FIG. 2 shows a control flowchart while FIG. 4 is a control time chart. First, in step S201 a determination is made as to whether or not a condition of fuel cut has established. When the condition is not met, control ends the routine or procedure without performing processes in steps S202 through S211. When the condition of the fuel cut operation has been established, control proceeds to step S202. The condition of the fuel cut operation may be defined by a fuel cut at a deceleration of the vehicle or by a fuel cut operation during a high rotation speed, as described above.

In step S202, based on the respective outputs from the first air-fuel ratio sensor 128A, the second air-fuel sensor 128B and the engine rotation speed (displacement volume), the oxygen adsorption or storage amount that is adsorbed on the first catalyst 126 is estimated. Similarly, in step S203, based on the respective outputs from the second air-fuel ration sensor 128B, the third air-fuel ratio sensor 128C, and the engine rotation speed (displacement volume), the oxygen adsorption or storage amount by the second catalyst 127 is estimated. These calculations for estimate are repeatedly continued until the fuel cut operation will terminate in step S204. The oxygen ($O_2$) storage amount of the first catalyst and the oxygen ($O_2$) storage amount of the second catalyst, shown in FIG. 4, represent the oxygen adsorption or storage amounts calculated in step S202 and S203, respectively. Substantially simultaneously with the start of fuel cut operation (time t1), the oxygen adsorption amount of the first catalyst 126 increases and the oxygen adsorption amount of the second catalyst 127 increases with a slight delay (at time t2).

Upon confirming that the fuel cut operation has ended in step S204 (time t3), control proceeds to step S205 where the air-fuel ratio of an air fuel mixture to be introduced into the combustion chamber 123 will be set at a first degree of richness that is richer in fuel than stoichiometry. Then, determination is made in step S206 whether or not the output of the second air-fuel ratio sensor 128B exceeds a predetermined value Vs1. When the output of the second air-fuel sensor 128B exceeds Vs1 (time t4), then control proceeds to step S207. The threshold Vs1 of the second air-fuel ratio sensor 128B corresponds to an output value in a state in which the first catalyst 126 recovers to stoichiometric, for example.

In step S207, subtraction operation is started from the oxygen adsorption or storage amount of the second catalyst 127 that is calculated in step S203 (time t4 to t5). This subtraction operation is performed on the basis the second air-fuel ratio sensor 128B, the third air-fuel ratio sensor 128C, and the engine rotation speed (displacement volume). Then, once the oxygen adsorption amount of the second catalyst 127 has been decreased to the target oxygen adsorption amount, control proceeds to step S209. This target oxygen adsorption amount may be determined in advance by experiment or computer simulations. Note that, in step S208 in the present embodiment, a determination is made that the oxygen adsorption amount of the second catalyst 127 from which a predetermined allowance has subtracted has decreased to the target oxygen adsorption or storage amount.

In step S209, the air-fuel ratio of the air fuel mixture to be introduced into the combustion chamber 123 is switched to a second degree of richness, that is leaner than the first degree of richness and richer than stoichiometric (time t5). Subsequently, in step S210, determination is made whether or not the output of the third air fuel ratio sensor 128C exceeds a predetermined value, Vs2. When the output of the third air-fuel ratio sensor 128C2 exceeds Vs2 (time t6), control proceeds to step S211 and ends the air-fuel ratio enrichment control. This threshold value Vs2 of the third air-fuel ratio sensor 128C corresponds to an output value in a state in which the second catalyst 127 recovers to stoichiometry.

As described above, according to the exhaust gas purification control of the present embodiment, the recovery process of the oxygen adsorption capacity of the first catalyst 126 and the second catalyst 127 due to a fuel cut operation is performed at a first degree of richness with a great degree of richness until the oxygen adsorption amount of the second catalyst has decreased to a target value even after the oxygen adsorption capacity of the first catalyst 126 has recovered. Thus, as shown in FIG. 4, a greater reduction rate of the oxygen adsorption amount of the second catalyst is obtained (i.e., the absolute value of inclination of decrease between time t4 and t5 is greater), and, as compared to a conventional method indicated by a dotted line, the oxygen adsorption capacity may be recovered efficiently. Therefore, a high Nox conversion rate may be obtained as shown in the figure.

Figure 3:
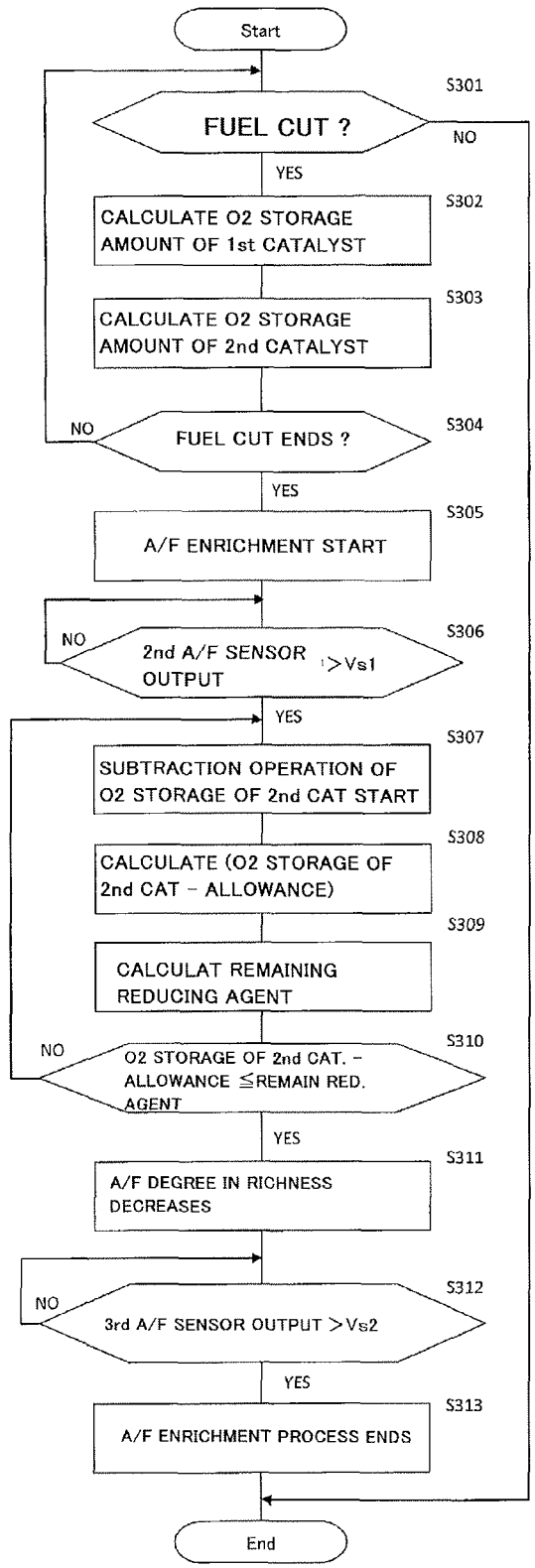
FIG. 3 is a flowchart illustrating another procedure of the exhaust gas purification control executed by the engine control unit in FIG. 1.

In the embodiment described above, the switching timing at which the degree of richness of injected fuel is switched from the first degree of richness to the second degree of richness is set to the point in time in which the oxygen adsorption or storage amount of the second catalyst 127 has reached the target oxygen adsorption or storage amount (see step S208, FIG. 2). However, at this point, since the exhaust passage 125 upstream of the second catalyst 127 is filled with the reducing agent with the first degree of richness, the switching time may be tuned with reference to the amount of the reducing agent as a reference. FIG. 3 represents another control flow pertaining to the other embodiment according to the present invention.

Since steps S301 through S307 are the same as the control contents in steps S201 to S207 in FIG. 2 described above, the description thereof will be omitted. In step S308, the oxygen adsorption amount of the second catalyst 127 subtracted in step S307 is further subjected to subtraction by an allowance, and in the subsequent step S309, the amount of reducing agent with a fuel-rich content remaining in the exhaust passage 125 on the upstream side of the second catalyst 127 is calculated. The amount of reducing agent is calculated based on the degree of richness in air-fuel ratio (here, the first degree of richness), an intake air amount, and a correction coefficient for compensating for the reaction rate with oxygen by using the volume of the exhaust passage 125 upstream of the second catalyst 127.

In step S310, upon confirming that the value that is obtained by subtracting the allowance from the oxygen adsorption amount of the second catalyst 127 decreased to the amount with which the remaining reducing agent upstream of the second catalyst 127 reacts in proper quantity or in a just enough amount (because of the reduction by the allowance, less than the just enough amount), control proceeds to step S311. Note that the allowances in steps S308 and S310 may be set to zero.

In step S311, the air-fuel ratio of air fuel mixture introduced into the combustion chamber 123 is switched to a second degree of richness that is leaner in fuel than the first degree fo richness and richer in fuel than the stoichiometric. Subsequently, in step S312, determination is made as to whether or not the output of the third air-fuel ratio sensor 128C exceeds a predetermined value of Vs2, and when the output of the third air-fuel ratio sensor 128C exceeds the Vs2 (time t6), control proceeds to step S312 and ends the air-fuel ratio enrichment control.

Even with such configuration, the recovery process of the oxygen adsorption capacity of the first catalyst 126 and the second catalyst 127 associated with a fuel cut operation will be performed in accordance with a first degree of richness that is greater in the degree of richness until the oxygen adsorption amount of the second catalyst decreases to a target value even after the oxygen adsorption or storage capacity of the first catalyst 126 has recovered. Therefore, as shown in FIG. 4, the reduction rate in the oxygen adsorption amount of the second catalyst 127 is great (i.e., the absolute value of the inclination of decrease between time t4 and t5 is great) so that the oxygen adsorption capacity may be recovered with efficiency compared to the conventional method indicated by a dotted line in the figure. Thus, as shown in the figure, the NOx conversion rate becomes high. Further, when it is confirmed that the oxygen adsorption amount of the second catalyst 127 has decreased to such an amount with which the remaining reducing agent present in the upstream side of the second catalyst 127 react through oxidation and reduction in a just enough proportion, the air-fuel ratio is switched to a second degree of richness that is leaner than the first degree of richness yet richer than the stoichiometric. Thus, when the third air-fuel ratio sensor 128C downstream of the second catalyst 127 detects a rich air-fuel ratio, the degree of richness is set at the second degree that is less in fuel in the first degree of richness so that the fuel component passing through the second catalyst 127 may be suppressed. In particular, even when the intake air amout is subject to change, the degree of richness of the injected fuel may be switched at an optimal timing.

The cecond air-fuel ratio sensor 128B above corresponds to the detection unit according to the present invention. The first air-fuel ratio sensor 128A, a second air-fuel ratio sensor 128B, a third air-fuel ratio sensor 128C, and the crank angle sensor 131 correspond to an estimate unit according to the present invention. Finally, the engine control unit 11 corresponds to the enrichment control unit according to the present invention.

DESCRIPTION OF REFERENCE SIGNS

EG engine (internal combustion)
11 engine controller 11

111, 111a ... intake passage
112 ... air filter
113 ... air flow meter
114 ... throttle valve
115 ... collector
116 ... throttle valve actuator
117 ... throttle sensor
118 ... fuel injection valve
119 ... cylinder
120 ... piston
121 ... intake valve
122 ... exhaust valve
123 ... combustion chamber
124 ... ignition plug
125 ... exhaust passage
126 ... first catalyst
127 ... second catalyst
128A ... first air-fuel ratio sensor
128B ... second air-fuel ratio sensor
128C ... third air-fuel ratio sensor
129 ... muffler
130 ... crankshaft
131 ... crank angle sensor
132 ... cooling jacket
133 ... water temperature sensor

The invention claimed is:

1. An exhaust gas purification control device for an internal combustion engine with a plurality of catalysts disposed in series in an exhaust passage, comprising:

a first catalyst and a second catalyst each disposed in the exhaust passage downstream from an exhaust valve of a cylinder, wherein the first catalyst is located upstream of the second catalyst;

a first sensor disposed upstream from the first catalyst;

a second sensor disposed between the first and second catalysts;

a third sensor disposed downstream from the second catalyst, wherein the first, second, and third sensors detect an air-fuel ratio (AFR) of the exhaust gas flowing into and out from the first and second catalysts;

an estimating unit that estimates an oxygen adsorption amount of the first catalyst and of the second catalyst; and an enrichment control unit that is configured to change the richness of the AFR of injected fuel temporarily, when the oxygen adsorption amount of the first catalyst and the second catalyst is estimated to be greater than a predetermined value, wherein the enrichment control unit is configured to set the amount of the injected fuel to a first AFR that is richer than a stoichiometric AFR from the start of an enrichment process and to maintain the first AFR for a predetermined period even after an output of the second sensor indicates a state in which the first catalyst recovers to stoichiometric, and after the predetermined period has elapsed, to set the AFR to a second AFR that is less rich than the first AFR and more rich than a target AFR.

2. The exhaust gas purification control device of claim 1, wherein the enrichment control unit maintains the first AFR until the oxygen adsorption amount of the second catalyst has fallen below a target oxygen adsorption amount; and, when the oxygen adsorption amount of the second catalyst has fallen below the target oxygen adsorption amount, sets the AFR to a second value that is less rich than the first AFR.

3. The exhaust gas purification control device of claim 1, wherein the enrichment control unit maintains the first AFR until the oxygen adsorption amount of the second catalyst has reached an amount with which a reducing agent present in the exhaust passage upstream of the second catalyst reacts in a desired amount, and, when the oxygen adsorption amount of the second catalyst has reached the amount with which the reducing agent reacts in a desired amount, sets the AFR to a second value that is less rich than the first AFR.

* * * * *